(12) United States Patent
Kim et al.

(10) Patent No.: US 10,910,629 B2
(45) Date of Patent: Feb. 2, 2021

(54) METHOD FOR MANUFACTURING ELECTRODE AND CURRENT COLLECTOR FOR ELECTROCHEMICAL DEVICE

(71) Applicant: LG Chem, Ltd., Seoul (KR)

(72) Inventors: Eun-Bee Kim, Daejeon (KR); Jung-Pil Lee, Daejeon (KR)

(73) Assignee: LG Chem, Ltd.

( * ) Notice: Subject to any disclaimer, the term of this patent is extended or adjusted under 35 U.S.C. 154(b) by 248 days.

(21) Appl. No.: 16/067,967

(22) PCT Filed: Jul. 18, 2017

(86) PCT No.: PCT/KR2017/007733
§ 371 (c)(1),
(2) Date: Jul. 3, 2018

(87) PCT Pub. No.: WO2018/016855
PCT Pub. Date: Jan. 25, 2018

(65) Prior Publication Data
US 2020/0014019 A1    Jan. 9, 2020

(30) Foreign Application Priority Data

Jul. 18, 2016    (KR) .................. 10-2016-0090985

(51) Int. Cl.
| | | |
|---|---|---|
| *H01M 4/04* | (2006.01) | |
| *H01M 4/66* | (2006.01) | |
| *H01M 4/88* | (2006.01) | |

(52) U.S. Cl.
CPC ....... *H01M 4/0471* (2013.01); *H01M 4/0404* (2013.01); *H01M 4/661* (2013.01); *H01M 4/8828* (2013.01)

(58) Field of Classification Search
CPC ........ H01M 4/0435; H01M 4/04; H01M 4/64; H01M 4/0404; H01M 4/043;H01M 4/0471; H01M 4/139; H01M 4/661; H01M 4/662; H01M 4/669
See application file for complete search history.

(56) References Cited

U.S. PATENT DOCUMENTS 6,086,690 A * 7/2000 Wycliffe ................ C22F 1/047
148/552
2002/0102350 A1    8/2002 Endo et al.
(Continued)

FOREIGN PATENT DOCUMENTS

| JP | H1197032 A | * 4/1999 | ............. H01M 4/02 |
| JP | 2002270186 A | 9/2002 | |

(Continued)

OTHER PUBLICATIONS

Search report from International Application No. PCT/KR2017/007733, dated Oct. 31, 2017.
(Continued)

*Primary Examiner* — Barbara L Gilliam
*Assistant Examiner* — George Kim
(74) *Attorney, Agent, or Firm* — Lerner, David, Littenberg, Krumholz & Mentlik, LLP

(57) ABSTRACT

A current collector for an electrochemical device and a method for manufacturing the same are provided. The current collector has wrinkles formed spontaneously according to heat expansion and cold shrinking of a metal thin film. A method for manufacturing an electrode includes heating a metal thin film for a current collector, stretching the heated metal thin film, and cooling the heated metal thin film.

15 Claims, 5 Drawing Sheets

(56) References Cited

U.S. PATENT DOCUMENTS

| | | | |
|---|---|---|---|
| 2004/0157128 A1* | 8/2004 | Seto | H01M 4/661 429/233 |
| 2005/0142374 A1 | 6/2005 | Chen et al. | |
| 2006/0068272 A1* | 3/2006 | Takami | B60L 3/0046 429/62 |
| 2010/0075222 A1* | 3/2010 | Watanabe | H01M 4/0404 429/199 |
| 2014/0170482 A1 | 6/2014 | Park et al. | |
| 2016/0013459 A1 | 1/2016 | Suh et al. | |
| 2017/0338449 A1 | 11/2017 | Rho et al. | |

FOREIGN PATENT DOCUMENTS

| | | | | |
|---|---|---|---|---|
| JP | 2014035876 A | | 2/2014 | |
| JP | WO2015045350 A1 | * | 3/2017 | ............ H01M 4/386 |
| KR | 100346582 B1 | * | 7/2002 | |
| KR | 101075279 B1 | * | 10/2011 | .......... H01M 4/0404 |
| KR | 101075279 B1 | | 10/2011 | |
| KR | 20120131779 A | | 12/2012 | |
| KR | 20150080745 A | * | 7/2015 | ............ H01M 10/04 |
| KR | 20150080745 A | | 7/2015 | |
| KR | 20160058626 A | | 5/2016 | |
| WO | 2012117991 A1 | | 9/2012 | |

OTHER PUBLICATIONS

Lee KL, Jung JY, Lee SW, Moon HS, Park JW. Electrochemical characteristics of a-Si thin film anode for Li-ion rechargeable batteries. Journal of Power Sources. Apr. 22, 2004;129(2):270-4.
Supplemental European Search Report for EPO17831328.4 dated Jun. 14, 2019.

* cited by examiner

METHOD FOR MANUFACTURING ELECTRODE AND CURRENT COLLECTOR FOR ELECTROCHEMICAL DEVICE

CROSS-REFERENCE TO RELATED APPLICATIONS

The present application is a national phase entry under 35 U.S.C. § 371 of International Application No. PCT/KR2017/007733, filed Jul. 18, 2017, which claims priority to Korean Patent Application No. 10-2016-0090985 filed on Jul. 18, 2016 in the Republic of Korea, the disclosures of which are incorporated herein by reference.

TECHNICAL FIELD

The present disclosure relates to a current collector for an electrochemical device and a method for manufacturing the same. The present disclosure also relates to a current collector and an electrode obtained by the method and having improved flexibility.

BACKGROUND ART

Recently, technological development in the field of electronics have led to significant growth of the market of not only cellular phones, game players, portable multimedia players (PMP) and MPEG audio layer-3 (MP3) players but also various portable electronic instruments, such as smart phones, smart pads, electronic books, watch-type phones and portable medical instruments attached to the user's body. As the market of such portable electronic instruments grows, batteries suitable for driving such portable electronic instruments are increasingly in demand. Particularly, for the sake of convenience of use of portable electronic instruments, there is an increasing need for flexibility of batteries. In addition, a need for flexibility of batteries is increased more and more so that the batteries may be inserted easily to the narrow spaces of such portable electronic instruments.

In general, an electrode is manufactured by applying a slurry for forming an electrode onto the surface of a metal thin film, such as aluminum or copper, followed by drying. However, the electrode manufactured by such a method is hardly applicable to flexible type or bendable type batteries, because the metal thin film has limited flexibility. FIG. 3 is a schematic view illustrating an electrode obtained according to the conventional method. In general, a slurry for an electrode active material is applied to a metal thin film as a current collector and then dried to obtain an electrode. When the electrode obtained according to the conventional method is deformed, for example, bent, there is a problem in that the electrode active material layer is damaged.

Korean Laid-Open Patent No. 10-2012-0131779 discloses a battery including a separator formed integrally with an electrode through the infiltration of the electrode active material to a part of the pores of the separator. However, also in this case, there is a limitation in manufacture of a flexible type battery since a metal thin film having low flexibility is used as a current collector.

DISCLOSURE

Technical Problem

The present disclosure is designed to solve the problems of the related art, and therefore the present disclosure is directed to providing a current collector having improved flexibility and applicable to a flexible type battery or bendable type battery, and an electrode including the current collector. It will be easily understood that other objects and advantages of the present disclosure may be realized by the means shown in the appended claims and combinations thereof.

Technical Solution

The present disclosure provides a method for manufacturing an electrode capable of solving the above-mentioned technical problem, and an electrode obtained by the method.

According to a first embodiment of the present disclosure, there is provided a method for manufacturing an electrode, including the steps of: (S10) heating a metal thin film for a current collector; (S20) stretching the heated metal thin film; and (S30) cooling the heated metal thin film.

According to a second embodiment, there is provided a method for manufacturing an electrode of the first embodiment, wherein the metal thin film is a metal thin film for a current collector and includes copper and/or aluminum.

According to a third embodiment, there is provided a method for manufacturing an electrode of the first or the second embodiment, wherein the heating in step (S10) is carried out under vacuum or under atmosphere purged with an inert gas in order to prevent oxidation of the metal thin film.

According to a fourth embodiment, there is provided a method for manufacturing an electrode of the first to the third embodiment, wherein step (S20) is carried out by stretching the metal thin film at a ratio of 2-25%.

According to a fifth embodiment, there is provided a method for manufacturing an electrode of the first to the fourth embodiment, wherein step (S30) further includes the following steps (S31) to (S33): (S31) cooling the metal thin film to the surface temperature corresponding to −100° C. to −150° C. based on the heating temperature in step (S20); (S32) applying a slurry for forming an electrode active material layer warmed to 60° C.-100° C. to the surface of the metal thin film; and (S33) drying the slurry for forming an electrode active material layer.

According to a sixth embodiment, there is provided a method for manufacturing an electrode of the fifth embodiment, which further includes carrying out cooling of an electrode simultaneously with step (S33) or after carrying out step (S33).

According to a seventh embodiment, there is provided a method for manufacturing an electrode of the first to the fourth embodiment, wherein step (S30) further includes the following steps: applying a slurry for forming an electrode active material layer to the surface of the stretched metal thin film; and drying the slurry for forming an electrode active material layer.

According to an eighth embodiment, there is provided a method for manufacturing an electrode of the seventh embodiment, wherein the slurry for forming an electrode active material layer in step is at room temperature (25° C.)±10° C.

According to a ninth embodiment, there is provided a method for manufacturing an electrode of the first to the fourth embodiment, wherein step (S30) further includes the following steps: cooling the temperature of the surface of the metal thin film to room temperature (25° C.); applying a slurry for forming an electrode active material layer to the surface of the cooled metal thin film; and drying the slurry for forming an electrode active material layer.

According to a tenth embodiment, there is provided a method for manufacturing an electrode of the ninth embodiment, wherein step is carried out by air blast cooling and/or cold air cooling, and the metal thin film is cooled at a rate of 5° C./min-20° C./min.

According to an eleventh embodiment, there is provided a method for manufacturing an electrode of the first to the tenth embodiment, wherein the metal thin film has a thickness of 5 μm to 30 μm.

According to a twelfth embodiment, there is provided a method for manufacturing an electrode of the first to the eleventh embodiment, which further include step of forming a heat resistant layer containing inorganic particles and a binder polymer on the surface of the electrode.

According to a thirteenth embodiment of the present disclosure, there is also provided an electrode obtained by any one of the first embodiment to the twelfth embodiment, the electrode including a current collector and an electrode active material layer formed on the surface of the current collector, wherein the current collector has wrinkles formed spontaneously according to heat expansion and cold shrinking, and the electrode active material layer has a surface pattern corresponding to the wrinkles of the current collector.

According to a fourteenth embodiment of the present disclosure, there is provided an electrode assembly including a negative electrode, a positive electrode and a separator interposed between the negative electrode and the positive electrode, wherein the negative electrode and/or the positive electrode is the electrode obtained by any one of the first embodiment to the twelfth embodiment.

Advantageous Effects

The current collector and electrode according to the present disclosure have wrinkles formed by heat expansion and cold shrinking, and thus provides an electrode with improved flexibility. In addition, when a bendable type battery is manufactured by using the electrode, generation of cracks on the electrode active material is reduced even under shape deformation, thereby reducing separation of the electrode active material and improving moldability of the electrode active material layer.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect, there is provided an electrode having improved flexibility. The electrode includes a metal current collector and an electrode active material layer formed on one surface of the metal current collector, and the metal current collector has wrinkles formed by expansion and shrinking of metal on the surface thereof. In addition, according to the present disclosure, the electrode active material layer may have surface irregularities corresponding to the wrinkles formed on the current collector.

According to the present disclosure, the electrode is for use in an electrochemical device. The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer ion batteries, are preferred.

In another aspect, there is provided a method for manufacturing an electrode having improved flexibility. The method is characterized by forming wrinkles on the surface of the current collector by subjecting a metal thin film to be used as a current collector to heat expansion and cold shrinking.

Figure 1:
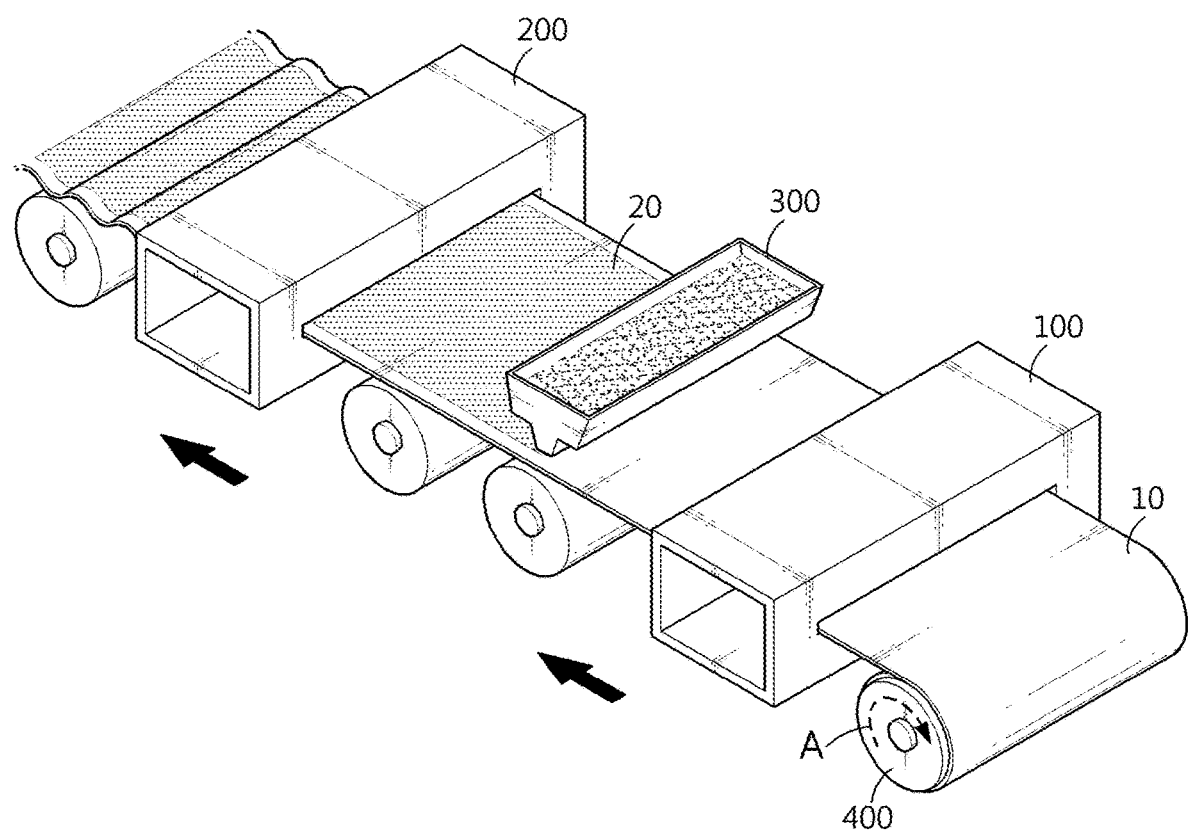
FIG. 1 is flow chart schematically illustrating the process for manufacturing an electrode according to an embodiment of the present disclosure.

FIG. 1 is flow chart schematically illustrating the process for manufacturing an electrode according to an embodiment of the present disclosure. Hereinafter, the present disclosure will be explained in more detail with reference to FIG. 1.

First, a metal thin film for a current collector is prepared. According to an embodiment of the present disclosure, the current collector may be a positive electrode current collector or negative electrode current collector. There is no particular limitation in the current collector, as long as it causes no chemical change in the corresponding battery and is stable. When a current collector is corroded, it is not possible to realize sufficient current collection capability as a battery repeats cycles, thereby reducing the service life of the battery. Particular examples of the current collector may include those made of stainless steel; aluminum; nickel; titanium; baked carbon; copper; stainless steel surface-treated with carbon, nickel, titanium or silver; aluminum-cadmium alloy; a non-conductive polymer surface-treated with a conductive material; or a conductive polymer.

According to an embodiment of the present disclosure, the metal thin film may be copper for a negative electrode current collector and may be aluminum for a positive electrode current collector suitably.

The metal thin film preferably has a tensile strength of 20 kgf/mm$^2$ or more, or 30 kgf/mm$^2$. In addition, the metal thin film has an elongation of 2-25% and a thickness of 5-30 μm. For example, when an aluminum thin film is used, it has a tensile strength of at least 20 kgf/mm$^2$ preferably. In addition, the aluminum thin film preferably has an elongation of 2-10% or 2-5% or 2-4%, and a thickness of 10-20 µm. According to an embodiment of the present disclosure, when a copper thin film is used, it has a tensile strength of at least 30 kgf/mm² preferably. In addition, the copper thin film preferably has an elongation of 2-10% or 2-5% or 2-4%, and a thickness of 10-20 µm.

As used herein, 'elongation' is based on a reference point distance and refers to a percentage of the difference between the reference point distance after extension and initial reference point distance, divided by the initial reference point distance. Herein, the reference point distance is the distance between two different points on the surface of the metal thin film.

The above-defined range is described by exemplifying a copper thin film or aluminum thin film. As the thickness of a current collector increases, tensile strength decreases while elongation increases. Therefore, it is possible to determine a thickness suitable for a material, considering wrinkling and flexibility of an electrode.

After the metal thin film is prepared, the metal thin film is heated (S10). According to an embodiment of the present disclosure, the heating may be carried out through a heater, such as a heating furnace or oven. In addition, the heater may be provided with a temperature controller. In this step, the metal thin film may be heated to its surface temperature of 200° C. or more and 300° C. or less, 400° C. or less, or 500° C. or less. Through the heating, the metal thin film has increased ductility so that it may be stretched in the subsequent step.

According to an embodiment of the present disclosure, the heating may be carried out by vacuum exhaustion of the inside of the heater or under atmosphere purged with an inert gas in order to prevent oxidation of the metal thin film during the heat treatment. By virtue of this, it is possible to inhibit oxidation of the metal thin film caused by oxygen during the heat treatment.

Then, the heated metal thin film is stretched (S20). Herein, the stretching is carried out in order to maximize wrinkling caused by cold shrinking of the metal thin film as described hereinafter. According to an embodiment, the stretching may be uniaxial stretching or biaxial stretching, preferably biaxial stretching. The elongation may vary with the material of the metal thin film but may be 2-25% as mentioned above.

After that, the metal thin film is cooled to form wrinkles on the surface of the metal thin film (S30). Herein, any one of the following Cooling Methods 1-3 for the metal thin film may be selected suitably to introduce wrinkles to the metal thin film.

[Cooling Method 1]

According to an embodiment of the present disclosure, an electrode active material layer is formed on the surface of the stretched metal thin film to provide an electrode. The electrode active material layer may be formed by preparing a slurry for forming an electrode active material layer, applying the slurry to the surface of the stretched metal thin film, and carrying out drying.

Herein, the slurry for forming an electrode active material layer is prepared by dispersing an electrode active material, a conductive material and a binder resin into a suitable solvent, and other suitable additives may be further added besides the above-mentioned ingredients. According to an embodiment of the present disclosure, the electrode slurry may be warmed to 60-120° C. When the temperature of the slurry satisfies the above-defined range, rapid shrinking does not occur while carrying out heating and application to the metal thin film and deterioration of the electrode active material is prevented.

According to an embodiment of the present disclosure, the temperature of the metal thin film may be cooled to a suitable temperature after the stretching and before the application of the slurry. According to an embodiment of the present disclosure, the cooling is carried out to −100° C. to −150° C. based on the heating temperature. For example, the temperature of the metal thin film may be controlled to about 100-200° C. or about 100-150° C.

Then, the slurry is dried. The drying is carried out preferably by natural drying, air blast drying, hot air drying, cold air drying and heat drying. According to an embodiment of the present disclosure, the electrode may be cooled simultaneous with the drying of the electrode slurry or along with the drying of the electrode slurry to accelerate shrinking of the current collector and wrinkling on the surface thereof. The cooling is carried out preferably at a cooling rate of 5° C./min to 10° C./min in view of the surface temperature of the electrode. In addition, the drying and/or cooling may be carried out until the surface temperature of the electrode reaches room temperature (25° C.).

After the cooling, the metal thin film expanded by heating is shrunk and wrinkles are formed on the surface of the current collector as a result of shrinking. In addition, when the current collector is shrunk to form wrinkles, surface irregularities corresponding to the wrinkles of the current collector are also formed. Thus, the current collector has wrinkles formed by heat expansion/cold shrinking and the electrode active material layer has surface irregularities corresponding to the shape of the wrinkles of the current collector.

FIG. 1 schematically shows the process for manufacturing an electrode carried out in a continuous process according to an embodiment of the present disclosure. The copper thin film may be heated and stretched continuously in a heating oven 100. In addition, stretching of the metal thin film may be carried out through a rotating roller in a continuous process. As shown in FIG. 1, the rotating direction of the conveying roller for the copper thin film may be controlled (for example, may be controlled so that the rotating directions of the two rollers disposed sequentially in the opposite direction (direction A), so that the metal thin film may be stretched.

Figure 2:
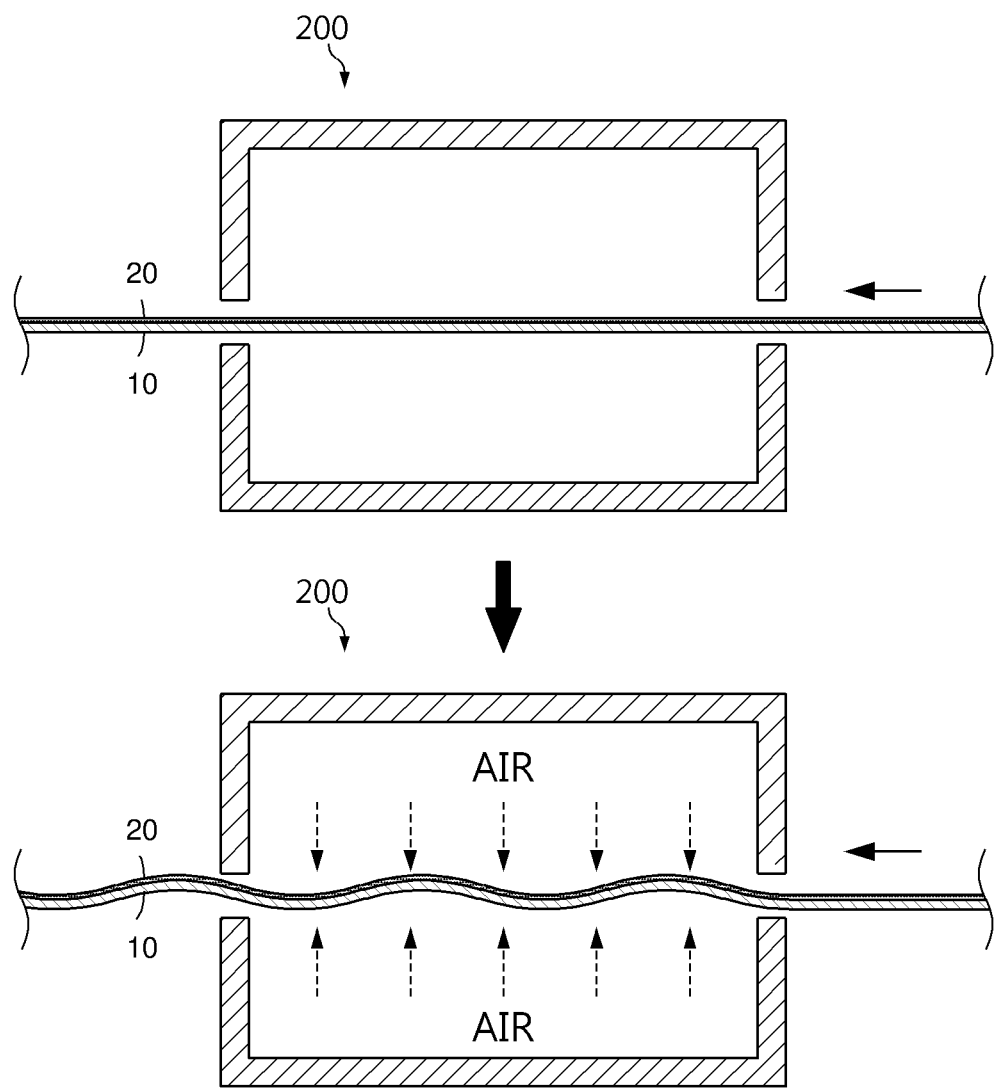
FIG. 2 is a schematic view illustrating the mechanism of formation of wrinkles in the current collector according to an embodiment of the present disclosure.
Figure 3:
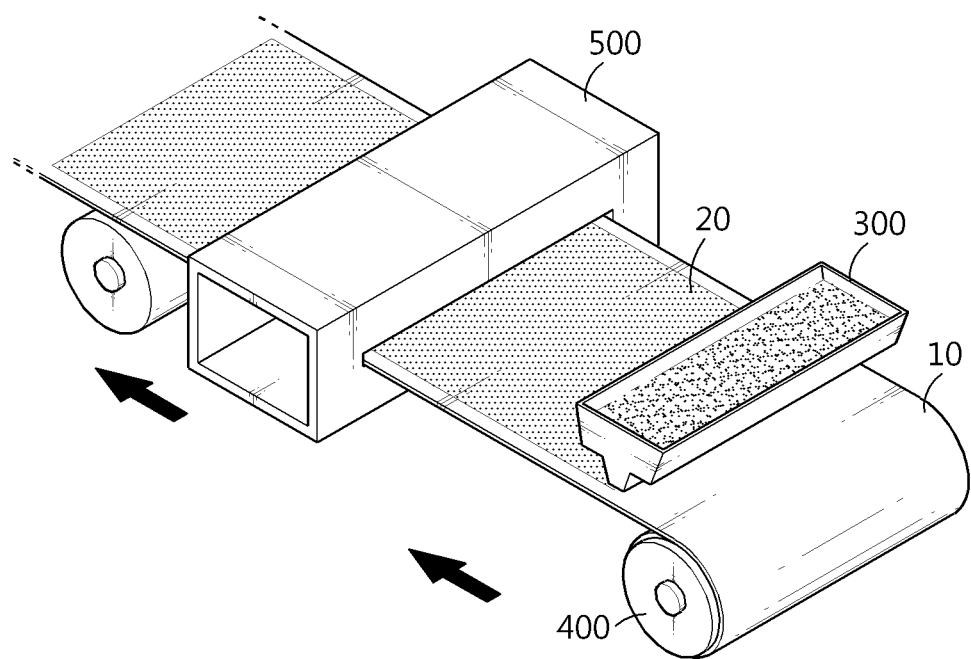
FIG. 3 is a schematic view illustrating the conventional method for manufacturing an electrode.
Figure 4:
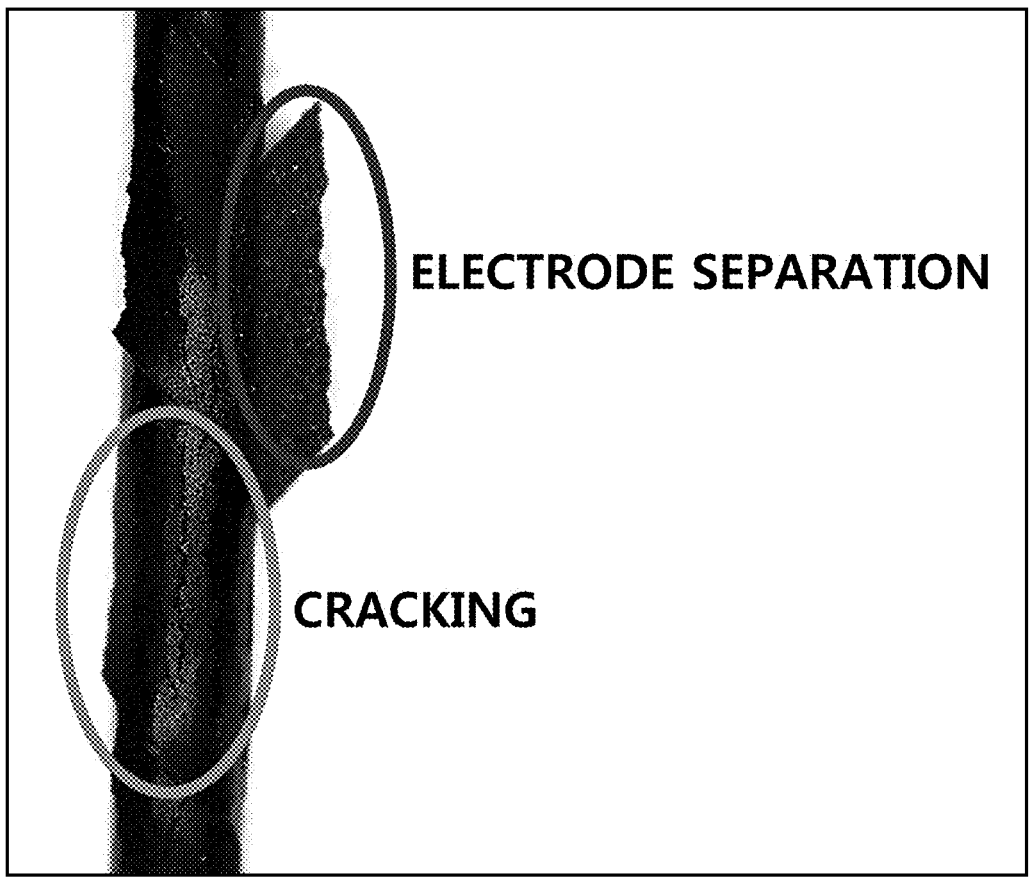
FIG. 4 shows the phenomena of cracking and electrode separation in Example 1-1.
Figure 5:
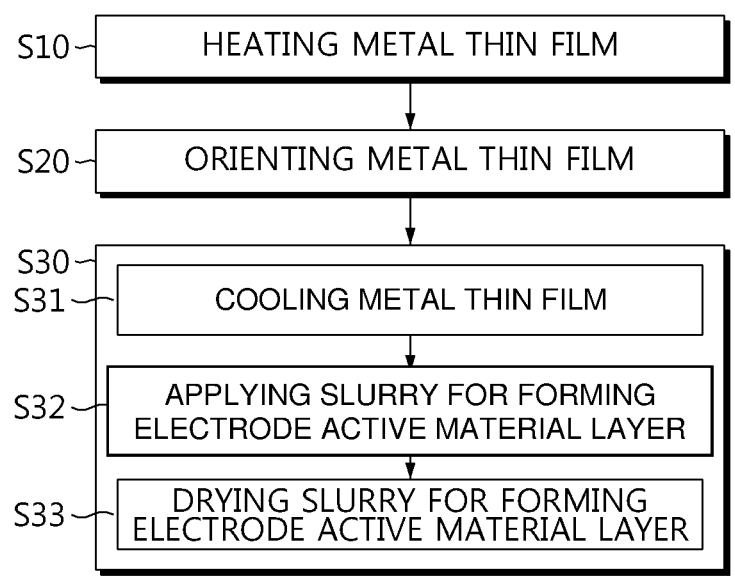
FIG. 5 is a flow chart illustrating the process for manufacturing an electrode according to the present disclosure in a stepwise manner.

FIG. 2 is a schematic view illustrating the mechanism of formation of wrinkles in the current collector according to an embodiment of the present disclosure. Referring to FIG. 2, while the metal thin film heated and stretched by air blast (e.g. cold air) in a dryer 200 is cooled, wrinkles are formed on the metal thin film and surface irregularities corresponding to the shape of the current collector are formed on the electrode active material layer. The wrinkles of the current collector are shown schematically in FIG. 2 to help understanding of the present disclosure. Actually, the shape of the wrinkles formed on the current collector varies with the properties of the material itself and has any amorphous or arbitrary pattern as a result of the shrinking/expansion of the material.

[Cooling Method 2]

According to an embodiment of the present disclosure, the cooling may be carried out by applying an electrode slurry to the surface of the heated and stretched metal thin film. Herein, a slurry for forming an electrode active material layer is prepared by dispersing an electrode active material, a conductive material and a binder resin into a suitable solvent. The slurry for forming an electrode active material layer may further include suitable additives besides the above-mentioned ingredients. While the temperature of the slurry is maintained at room temperature (25° C.)±10° C., the slurry is applied to the surface of the metal thin film to induce shrinking and cooling of the current collector.

After the cooling, the metal thin film expanded by heating is shrunk while forming wrinkles on the surface of the current collector. In addition, when the wrinkles are formed by shrinking of the current collector, surface irregularities corresponding to the wrinkles of the current collector are also formed on the electrode active material layer. In this case, there is an advantage in that warming of the slurry or use of a separate cooling device is not required, thereby providing high processing efficiency.

Then, the slurry is dried. The drying may be carried out at least one adequate method selected from natural drying, air blast drying, hot air drying, cold air drying and heat drying, and is not limited to any particular method. According to an embodiment of the present disclosure, wrinkling on the surface of the current collector may occur not only through the cooling step but also through the drying step.

[Cooling Method 3]

According to an embodiment of the present disclosure, the metal thin film is cooled and then an electrode active material layer may be formed on the surface of the metal thin film. First, the metal thin film heated and stretched in step (S20) is cooled to obtain the metal thin film having wrinkles formed on the surface thereof and the metal thin film is used as a current collector. According to an embodiment of the present disclosure, cooling of the metal thin film may be carried out at least one adequate method selected from natural cooling, air blast cooling and cold air cooling. Preferably, air blast cooling and/or cold air cooling may be used. Herein, the cooling is carried out preferably at a cooling rate of 5° C./min or more, and 20° C./min or less, or 10° C./min or less in view of the surface temperature of the metal thin film. In addition, the cooling may be carried out until the surface temperature of the metal thin film reaches room temperature (25° C.). When the cooling rate is smaller than the above-defined range, it is not possible to form a large amount of surface wrinkles.

After the current collector is obtained according to the above-described method, a slurry for forming an electrode active material layer is applied to the surface of the current collector and dried to form an electrode active material layer. The slurry for forming an electrode active material layer is prepared by dispersing an electrode active material, a conductive material and a binder resin into a suitable solvent, and other suitable additives may be further added besides the above-mentioned ingredients.

Then, the slurry is dried. The drying may be at least one adequate method selected from natural drying, air blast drying, cold air drying, hot air drying and heat drying, or a combination thereof.

An electrode for an electrochemical device is obtained according to the above-described method. The electrode obtained according to the method of the present disclosure includes a current collector and an electrode active material layer formed on the surface of the current collector. In addition, the current collector has wrinkles formed spontaneously by heat expansion and cold shrinking, and the electrode active material layer has a surface pattern corresponding to the wrinkles of the current collector.

As described above, since the current collector according to the present disclosure has spontaneously formed wrinkles and the electrode active material layer is formed according to the shape of wrinkles, it is possible to inhibit the problem of cracking on the electrode active material layer or separation of the electrode active material, caused by deformation of the electrode, when the electrode is applied to a bendable battery or flexible battery.

In addition, the method for manufacturing an electrode according to the present disclosure does not require a separate patterning process to introduce a pattern to a current collector or electrode active material layer but can form a suitable pattern by heating and cooling a current collector, thereby providing significantly high processing efficiency.

According to the related art, when a pattern is introduced to the surface of an electrode after forming an electrode active material layer, a method for removing a part of the electrode active material layer or rolling the electrode active material layer with a patterning member is applied. However, the above-mentioned method causes high consumption of an electrode active material and shows a high possibility of deterioration of an electrode during a rolling process. However, the method for manufacturing an electrode according to the present disclosure is effective for eliminating such processing disadvantages.

In addition, according to an embodiment of the present disclosure, a step of forming a heat resistant layer on the surface of the electrode may be carried out additionally.

The electrode obtained by the above-described method has surface irregularities, and thus may not be in close contact with a separator. Therefore, to prevent such a problem, a flat heat resistant layer may be further formed on the surface of the electrode. According to an embodiment of the present disclosure, the heat resistant layer may include a plurality of inorganic particles and a binder resin. The heat resistant layer is one including inorganic particles stacked and bound among themselves in a dot-like or surface-like manner by means of a binder resin, and the coating layer has a porous structure formed by interstitial volumes among the inorganic particles. When the heat resistant layer is used, it is possible to assist planarization of the surface of an electrode and to improve the heat resistance of the polymer separator as described hereinafter.

In still another aspect, there is provided an electrode assembly including the electrode obtained by the above-described method. The electrode assembly refers to a stacked structure including a negative electrode/a separator/a positive electrode stacked successively. The electrode assembly includes at least one negative electrode, at least one separator and at least one positive electrode. In yet another aspect, there is provided an electrochemical device, such as a battery, battery module and/or battery pack, including at least one of the electrode assembly as mentioned above.

When the electrode is a positive electrode, it may include, as a positive electrode active material: a layered compound such as lithium cobalt oxide ($LiCoO_2$) or lithium nickel oxide ($LiNiO_2$), or a compound substituted with one or more transition metals; a lithium manganese oxide represented by the chemical formula of $Li_{1+x}Mn_{2-x}O_4$ (wherein x is 0-0.33), $LiMnO_3$, $LiMn_2O_3$ or $LiMnO_2$; a lithium copper oxide ($Li_2CuO_2$); a vanadium oxide such as $LiV_3O_8$, $LiFe_3O_4$, $V_2O_5$ or $Cu_2V_2O_7$; a Ni-site type lithium nickel oxide represented by the chemical formula of $LiNi_{1-x}M_xO_2$ (wherein M is Co, Mn, Al, Cu, Fe, Mg, B or Ga, and x is 0.01-0.3); a lithium manganese composite oxide represented by the chemical formula of $LiMn_{2-x}M_xO_2$ (wherein M=Co, Ni, Fe, Cr, Zn or Ta, and x is 0.01-0.1) or $Li_2Mn_3MOs$ (wherein M=Fe, Co, Ni, Cu or Zn); $LiMn_2O_4$ in which Li is partially substituted with an alkaline earth metal ion; a disulfide compound; $Fe_2(MoO_4)_3$, $LiNi_xMn_{2-x}O_4$ (wherein $0.01 \leq x \leq 0.6$), or the like.

According to an embodiment of the present disclosure, particular examples of the negative electrode active material include: carbon and graphite materials, such as natural graphite, artificial graphite, expanded graphite, carbon fibers, non-graphitizable carbon, carbon black, carbon nanotubes, fullerene and activated carbon; metals, such as Al, Si, Sn, Ag, Bi, Mg, Zn, In, Ge, Pb, Pd, Pt and Ti, capable of alloying with lithium, and compounds containing the above elements; metals and metallic compounds, and composite compounds of carbon and graphite materials; lithium-containing nitrides; or the like. Particularly, a carbonaceous material is preferred and non-limiting examples thereof include at least one selected from the group consisting of graphite-based carbon, cokes-based carbon and hard carbon.

Herein, the separator functions as an ion conductive barrier which interrupts an electrical contact between the negative electrode and the positive electrode while passing ions therethrough. According to an embodiment of the present disclosure, the separator may include a porous polymer substrate having a plurality of fine pores. The porous polymer substrate may include but is not limited to a porous polymer substrate made of at least one selected from polymer resins, such as polyolefin, polyethylene terephthalate, polybutylene terephthalate, polyacetal, polyamide, polycarbonate, polyimide, polyether ether ketone, polyether sulfone, polyphenylene oxide, polyphenylene sulfide and polyethylene naphthalene. In addition, the porous polymer substrate may include a sheet-like film formed by melting a polymer resin or a non-woven web formed by stacking filaments obtained by melt spinning a polymer resin. Preferably, the porous polymer substrate is a sheet-like porous polymer substrate obtained by melting/molding the polymer resin.

Further, other battery elements not-described above herein, such as a separator, conductive material, binder resin or an electrolyte, may be those used conventionally in the field of a battery, such as a lithium secondary battery.

Hereinafter, the present disclosure will be explained in detail with reference to the examples. The following examples are for illustrative purposes only and not intended to limit the scope of the present disclosure.

1. EXAMPLES

Examples 1-1 to 1-3

(1) Preparation of Current Collector

A copper thin film having a thickness of about 20 μm was prepared. The copper thin film had a tensile strength of about 30 kgf/mm² and an elongation of about 5%. Next, the copper thin film was heated to a predetermined surface temperature. Then, the heated copper thin film was stretched uniaxially. The heating temperature and elongation of each sample were shown in the following Table 1.

TABLE 1

|  | Heating Temperature | Elongation |
| --- | --- | --- |
| Example 1-1 | 200° C. | 5% |
| Example 1-2 | 300° C. | 5% |
| Example 1-3 | 400° C. | 5% |

(2) Manufacture of Electrode

Then, a slurry for forming an electrode active material layer was applied to the surface of the current collector prepared from Preparation Example 1 to a thickness of 90 μm. The slurry is obtained by introducing and dispersing artificial graphite, carbon black and PVdF into NMP. In the slurry, artificial graphite, carbon black and PVdF were mixed at a weight ratio of 90:4:6. In addition, the slurry was heated to 150° C. The slurry was subjected to cold air drying to obtain an electrode. The dried electrode layer was rolled to a thickness of electrode active material layer of 55 μm. The cold air drying was carried out at a cooling rate of about 7° C./min until the surface temperature of the electrode reaches room temperature (25° C.).

Examples 2-1 and 2-2

(1) Preparation of Current Collector

A copper thin film having a thickness of about 20 μm was prepared. The copper thin film had a tensile strength of about 30 kgf/mm² and an elongation of about 5%.

Next, the copper thin film was heated to a predetermined surface temperature, and then maintained at the temperature for about 5 seconds. Then, the heated copper thin film was stretched uniaxially. After that, heating was stopped and cold air was blown from the upper and lower directions of the stretched copper thin film so that the surface temperature of the copper thin film was cooled to room temperature (25° C.). Herein, the cooling rate was about 7° C./min. The heating temperature and elongation of each sample were shown in the following Table 2.

TABLE 2

|  | Heating Temperature | Elongation |
| --- | --- | --- |
| Example 2-1 | 200° C. | 5% |
| Example 2-2 | 300° C. | 5% |

(2) Manufacture of Electrode

An electrode slurry was prepared by mixing artificial graphite, carbon black and PVdF with NMP. In the electrode slurry, artificial graphite, carbon black and PVdF were mixed at a weight ratio of 90:4:6. The slurry was applied to the surface of the current collector prepared from Preparation Example to a thickness of 90 μm and dried through air blast drying to obtain an electrode. Then, the dried electrode layer was rolled to a thickness of electrode active material layer of 55 μm.

2. COMPARATIVE EXAMPLE

A copper thin film having a thickness of about 20 μm was prepared. The copper thin film had a tensile strength of about 30 kgf/mm² and an elongation of about 5%. An electrode slurry was prepared by mixing artificial graphite, carbon black and PVdF with NMP. In the electrode slurry, artificial graphite, carbon black and PVdF were mixed at a weight ratio of 90:4:6. The slurry was applied to the surface of the current collector prepared from Preparation Example 1 to a thickness of 90 μm and dried through air blast drying to obtain an electrode. Then, the dried electrode layer was rolled to a thickness of electrode active material layer of 55 μm.

Test A.

Each of the electrodes according to Examples and Comparative Example was wound on a bar having a diameter of 1R (radius 1 mm) and the bar was bent at 90°, and the above procedure was repeated 150 times. In the case of Examples, cracking and/or separation of electrode active material occurred after 70 times of bending. On the contrary, in the case of Comparative Example, cracking and/or separation of electrode active material occurred after 10 times of repeated bending.

Test B. Increase in Surface Resistance

Each of the electrodes according to Examples and Comparative Example was determined for surface resistance before bending. Then, each of the electrodes according to Examples and Comparative Example was wound on a bar having a diameter of 15R (radius 15 mm) and the bar was bent at 90°, and the above procedure was repeated 1,500 times. Then, the surface resistance of each electrode was determined. The surface resistance was measured by using a surface resistance measuring system (CMT-SR2000N). After the test, it can be seen that each Example shows an increase in surface resistance of 110% or less but Comparative Example shows an increase in surface resistance of 200%.

TABLE 3

| | | Damage caused by bending | Increase in surface resistance |
|---|---|---|---|
| Examples | 1-1 | Cracking and separation occurred after 70 times | 110% |
| | 1-2 | Cracking and separation occurred after 125 times | 70% |
| | 1-3 | Cracking and separation occurred after 110 times | 85% |
| | 2-1 | Cracking and separation occurred after 80 times | 105% |
| | 2-2 | Cracking and separation occurred after 110 times | 73% |
| Comparative Example | 1-1 | Cracking and separation occurred after 10 times | 200% |
| | 1-2 | Cracking and separation occurred after 13 times | 203% |

The present disclosure has been described in detail with reference to particular examples and drawings but the scope of the present disclosure is not limited thereto. It should be understood that various changes and modifications within the scope of the disclosure will become apparent to those skilled in the art from this detailed description.

DESCRIPTION OF DRAWING NUMERALS

10: Current collector (Metal thin film), 20: Electrode active material layer, 100: Heater, 200: Drier, 300: Slurry coater, 400: Conveying roller, 500: Drier

What is claimed is:

1. A method for manufacturing an electrode, comprising steps of:
    heating a metal film for a current collector under vacuum or under atmosphere purged with an inert gas in order to prevent oxidation of the metal film;
    stretching the heated metal film;
    cooling the heated metal film to a surface temperature corresponding to −100° C. to −150° C. based on a heating temperature in the step of heating;
    applying a slurry for forming an electrode active material layer warmed to 60° C.-100° C. to a surface of the cooled metal film; and
    drying the slurry.

2. The method for manufacturing an electrode according to claim 1, wherein the metal film is a metal film for a current collector and comprises copper and/or aluminum.

3. The method for manufacturing an electrode according to claim 1, wherein the step of stretching is carried out by stretching the metal film to 102-125%.

4. The method for manufacturing an electrode according to claim 1, further comprising cooling the metal film and the slurry either simultaneously with or after the step of drying the slurry.

5. The method for manufacturing an electrode according to claim 1, wherein the metal film has a thickness of 5 μm to 30 μm.

6. The method for manufacturing an electrode according to claim 1, further comprising a step of forming a heat resistant layer containing inorganic particles and a binder polymer on a surface of the electrode.

7. A method for manufacturing an electrode, comprising steps of:
    heating a metal film for a current collector under vacuum or under atmosphere purged with an inert gas in order to prevent oxidation of the metal film;
    stretching the heated metal film;
    cooling the heated metal film by applying a slurry for forming an electrode active material layer to a surface of the stretched metal film; and
    drying the slurry.

8. The method for manufacturing an electrode according to claim 7, wherein in the step of applying the slurry, the slurry is at a temperature of 25° C.±10° C.

9. The method for manufacturing an electrode according to claim 7, wherein the metal film is a metal film for a current collector and comprises copper and/or aluminum.

10. The method for manufacturing an electrode according to claim 7, wherein the step of stretching is carried out by stretching the metal film to 102-125%.

11. The method for manufacturing an electrode according to claim 7, wherein the metal film has a thickness of 5 μm to 30 μm.

12. The method for manufacturing an electrode according to claim 7, further comprising a step of forming a heat resistant layer containing inorganic particles and a binder polymer on a surface of the electrode.

13. A method for manufacturing an electrode, comprising steps of:
    heating a metal film for a current collector under vacuum or under atmosphere purged with an inert gas in order to prevent oxidation of the metal film;
    stretching the heated metal film;
    cooling a temperature of a surface of the heated metal film to a temperature of 25° C.±10° C.;
    applying a slurry for forming an electrode active material layer to the surface of the cooled metal film; and
    drying the slurry.

14. The method for manufacturing an electrode according to claim 13, wherein the step of cooling the temperature of the surface of the heated metal film is carried out by air blast cooling and/or cold air cooling, and the metal film is cooled at a rate of 5° C./min-20° C./min.

15. The method for manufacturing an electrode according to claim 13, wherein the metal film is a metal film for a current collector and comprises copper and/or aluminum.

* * * * *